United States Patent
Matt et al.

(10) Patent No.: US 7,469,600 B2
(45) Date of Patent: Dec. 30, 2008

(54) MEASURING AND OPERATIONAL CIRCUIT FOR A CORIOLIS-MASS FLOW METER COMPRISING THREE MEASURING CHANNELS

(75) Inventors: Christian Matt, Aesch (CH); Philipp Alber, Eimeldingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 11/667,966

(22) PCT Filed: Nov. 2, 2005

(86) PCT No.: PCT/EP2005/055698

§ 371 (c)(1),
(2), (4) Date: Nov. 29, 2007

(87) PCT Pub. No.: WO2006/053829

PCT Pub. Date: May 26, 2006

(65) Prior Publication Data
US 2008/0156108 A1    Jul. 3, 2008

(30) Foreign Application Priority Data
Nov. 17, 2004   (DE) .................. 10 2004 055 553

(51) Int. Cl.
*G01F 1/84*    (2006.01)

(52) U.S. Cl. ................................. 73/861.356
(58) Field of Classification Search ........... 73/861.357, 73/861.356, 861.355
See application file for complete search history.

(56) References Cited

U.S. PATENT DOCUMENTS 3,559,171 A * 1/1971 Raudsep et al. ............. 714/821
5,331,859 A * 7/1994 Zolock .................. 73/861.356
5,469,748 A * 11/1995 Kalotay ................. 73/861.356

FOREIGN PATENT DOCUMENTS

| DE | 197 32 605 A1 | 2/1999 |
| DE | 696 07 756 T2 | 8/2000 |
| DE | 103 22 851 A1 | 12/2004 |
| EP | 0 702 212 A2 | 3/1996 |
| EP | 0 926 473 A2 | 6/1999 |
| EP | 1 489 390 A2 | 12/2004 |

* cited by examiner

*Primary Examiner*—Jewel Thompson
(74) *Attorney, Agent, or Firm*—Bacon & Thomas, PLLC

(57) ABSTRACT

In a method for determining mass-flow with the aid of a Coriolis mass-flow meter in which mass-flow (ṁ) is won from the phase difference of two sensor signals X17, X18, three measuring channels K1, K2, K3 are provided for the two sensor signals X17, X18. By selective switching of the sensor signals X17, X18 onto the measuring channels K1, K2, K3, phase error caused by the different signal paths can be determined and taken into consideration when calculating mass-flow (ṁ).

5 Claims, 5 Drawing Sheets

Figure 1:
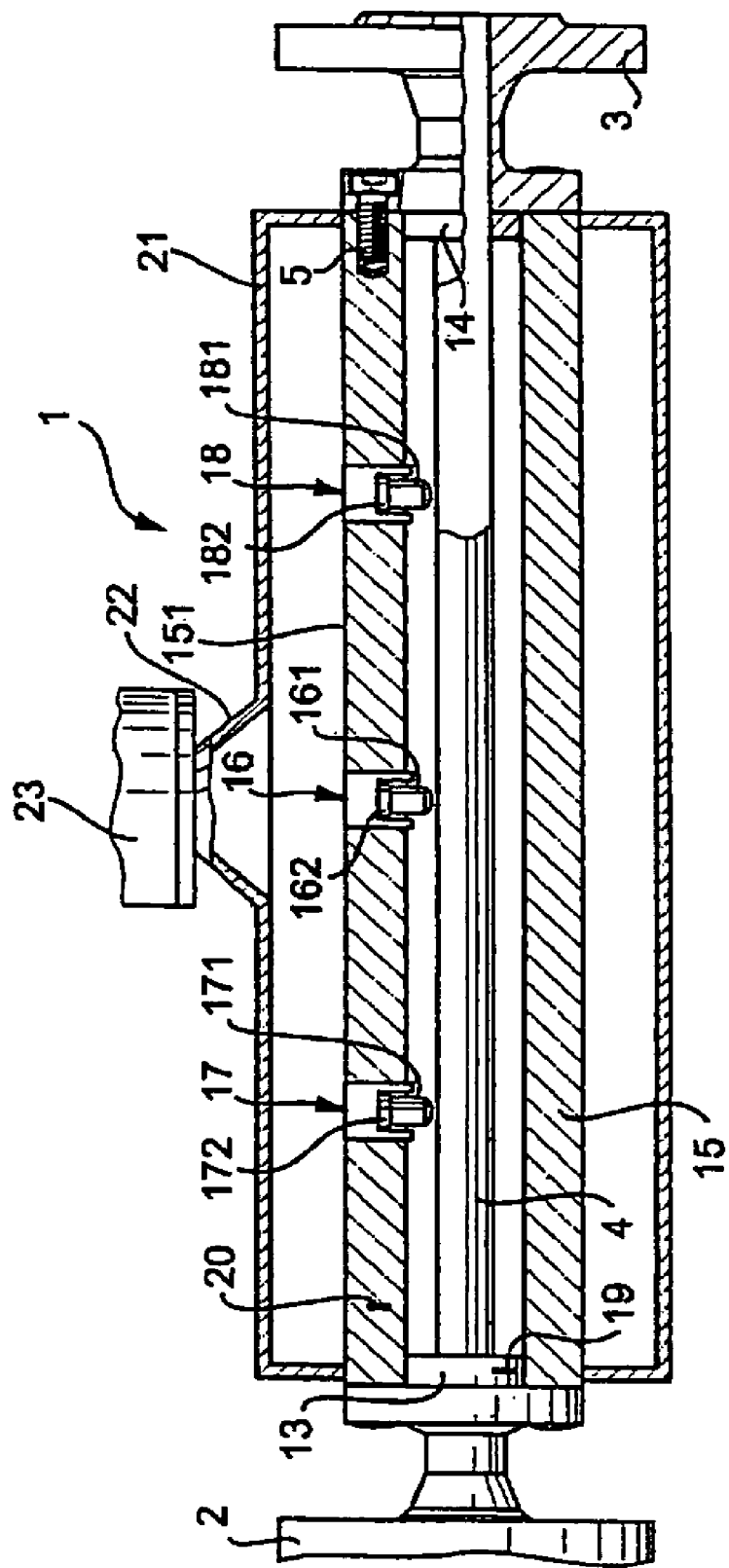

| Zyklus-schritt | Kanal 1 | Kanal 2 | Kanal 3 | ermittelte Phasendifferenz | Ermittlung Phasenfehler |
|---|---|---|---|---|---|
| 1 | X17 | X18 | X18 | $\Delta\varphi = \varphi1-\varphi2-\Delta\varphi_0 12$ | $\Delta\varphi_0 23 = \varphi2-\varphi3$ |
| 2 | X17 | X18 | X18 | $\Delta\varphi = \varphi1-\varphi3-\Delta\varphi_0 13$ | – |
| 3 | X17 | X17 | X18 | $\Delta\varphi = \varphi1-\varphi3-\Delta\varphi_0 13$ | $\Delta\varphi_0 12 = \varphi1-\varphi2$ |
| 4 | X17 | X17 | X18 | $\Delta\varphi = \varphi2-\varphi3-\Delta\varphi_0 23$ | – |
| 5 | X18 | X17 | X18 | $\Delta\varphi = \varphi2-\varphi3-\Delta\varphi_0 23$ | $\Delta\varphi_0 13 = \varphi1-\varphi3$ |

Fig. 4

MEASURING AND OPERATIONAL CIRCUIT FOR A CORIOLIS-MASS FLOW METER COMPRISING THREE MEASURING CHANNELS

The invention relates to a measuring and operating circuit for a Coriolis mass-flow meter with three measuring channels.

Coriolis mass-flow meters are used often in process measurements technology for ascertaining mass-flow, e.g. mass-flow rate, of a fluid in a section of pipeline.

The Coriolis measuring principle is based on causing the measuring tube, in which the fluid is flowing, to oscillate, and then evaluating the resulting oscillatory movement.

To this end, Coriolis mass-flow meters associate with the measuring tube an oscillation exciter and two oscillation sensors.

Measuring tube and fluid form together an oscillatable system, which, as a rule, is excited to oscillate at its reconsnace frequency. The resonance frequency depends on, among other things, the material and the dimensions of the measuring tube. Also the density of the flowing fluid affects the resonance frequency.

In certain applications, however, the measuring tube is not excited at the resonance frequency, but, instead, at a neighboring frequency.

The oscillation sensors register the oscillatory movement of the measuring tube at two locatoins spaced in the flow direction and convert such into sensor signals. The two sensor signals have the same frequency as the measuring tube oscillation. If a fluid (liquid, gas) is flowing through the measuring tube, then the two sensor signals are shifted in phase relative to one another, due to the Coriolis effect. The phase shift is a measure for the mass-flow of the fluid through this section of pipeline. The sensor signals are evaluated in a measuring portion of the electronics, in order to ascertain the exact value of the mass-flow. The measured value can be presented in a display unit on the Coriolis mass-flow meter or it can be forwarded to process control at a superordinated unit, e.g. a control unit (e.g. a PLC) or a control system.

Besides mass-flow, also other properties of the fluid, such as, for example, its density, can be ascertained. For this, additionally, a frequency evaluation of the measuring tube oscillation is necessary.

Various types of Coriolis mass-flow meters are manufactured and sold by the firm Endress+Hauser Flowtec AG.

In the patent U.S. Pat. No. 4,801,897, an exciter circuit portion for a Coriolis mass-flow meter is described, which is constructed as a type of analog, phase-lag-loop control. The exciter frequency for the measuring tube tunes, in such case, automatically to the resonance frequency of the measuring tube, even in the presence of variable fluid density.

Known measuring circuits work either on an analog basis or digitally. Examples of such measuring circuits are described in greater detail in EP 698783, U.S. Pat. No. 4,895,030, EP 702212, or U.S. Pat. No. 4,529,002.

EP 698783 discloses a measuring circuit for a Coriolis mass-flow meter. Includes is an analog control circuit, which controls the two sensor signals to the same amplitude.

EP 866319 discloses another measuring and operating circuit for a Coriolis mass-flow meter. In the case of this circuit, the two sensor signals are amplified before their further processing, with the application factor of the amplifier being variable. In a digital signal processor the sum and the difference of the two sensor signals are evaluated, as well as one of the sensor signals.

Recently, measuring circuits for Coriolis mass-flow meters have been disclosed (see e.g. German Offenlegungsschrift DE10132603), which directly measure the phase shift between the two censors signals and calculate the mass-flow therefrom. Depending on the construction of the Coriolis mass-flow meter, the phase shifts can be relatively small. Maximum phase shifts of 1.5 degrees are not improbable. Additional phase shifts caused in the two sensor signals via the two measuring channels should be avoided as much as possible. Phase shifts not stemming from the Coriolis effect are referred to as phase errors.

Due to the small measuring effect, especially in the case of small flow velocities, even very small phase errors can have an extremely negative effect on the measurement result.

One possible solution is to determine the phase error for the sensor signals in the two measuring channels at an earlier point in time and to take such into consideration in future evaluations.

However, due to the time dependency of the influencing factors, such as aging of the measuring transducer, ambient temperature, etc., a one-time determination would certainly not be enough. A regularly scheduled repetition of the determination would be a necessity.

Unfortunately, however, in measuring the phase error, the actual measurement has to be interrupted, at least for a short time. This is not desired, and, in the case of certain applications, not acceptable.

An object of the invention is to provide a method for determining mass-flow using a Coriolis mass-flow meter, which method does not have the above mentioned disadvantages and which, especially, eliminates phase errors and, at the same time, permits continuous measurement.

The object is achieved by the method as defined in claim 1.

Advantageous further developments of the invention are set forth in the dependent claims.

An essential idea of the invention is to provide for the two sensor signals, not two, but, instead, three measuring channels. By appropriate switching of the sensor signals to the three measuring channels, the relative phase error of each set of two measuring channels can be ascertained and taken into consideration in the determining of mass-flow.

In a further development of the invention, the sensor signals are cyclically switched to the three measuring channels.

In an alternative embodiment of the invention, a measuring channel is provided permanently for a particular measurement signal.

In a further embodiment of the invention, the relative phase error of two measuring channels is measured only every second cycle step.

An essential advantage offered by the method of the invention is that an interruption of the measuring is no longer necessary.

The invention also relates to an apparatus for performing the method.

Figure 2:
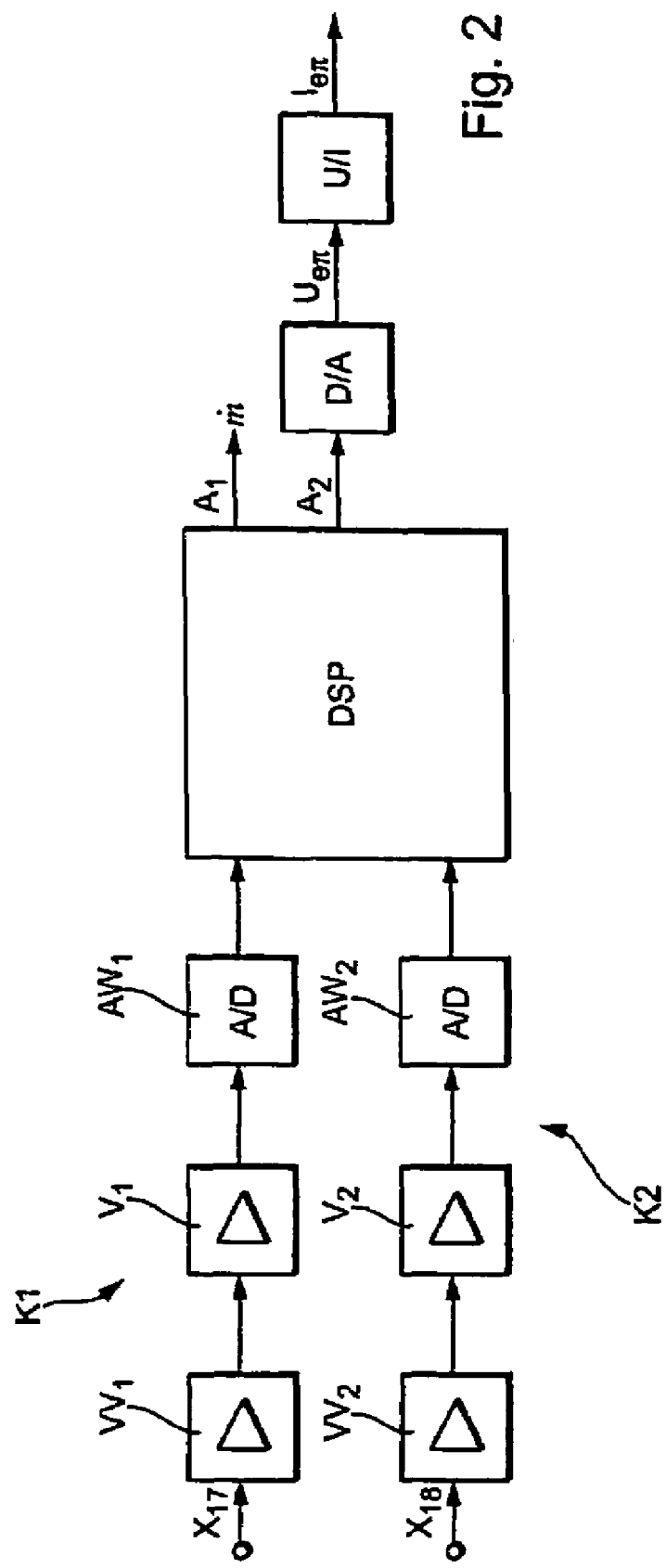
Figure 3:
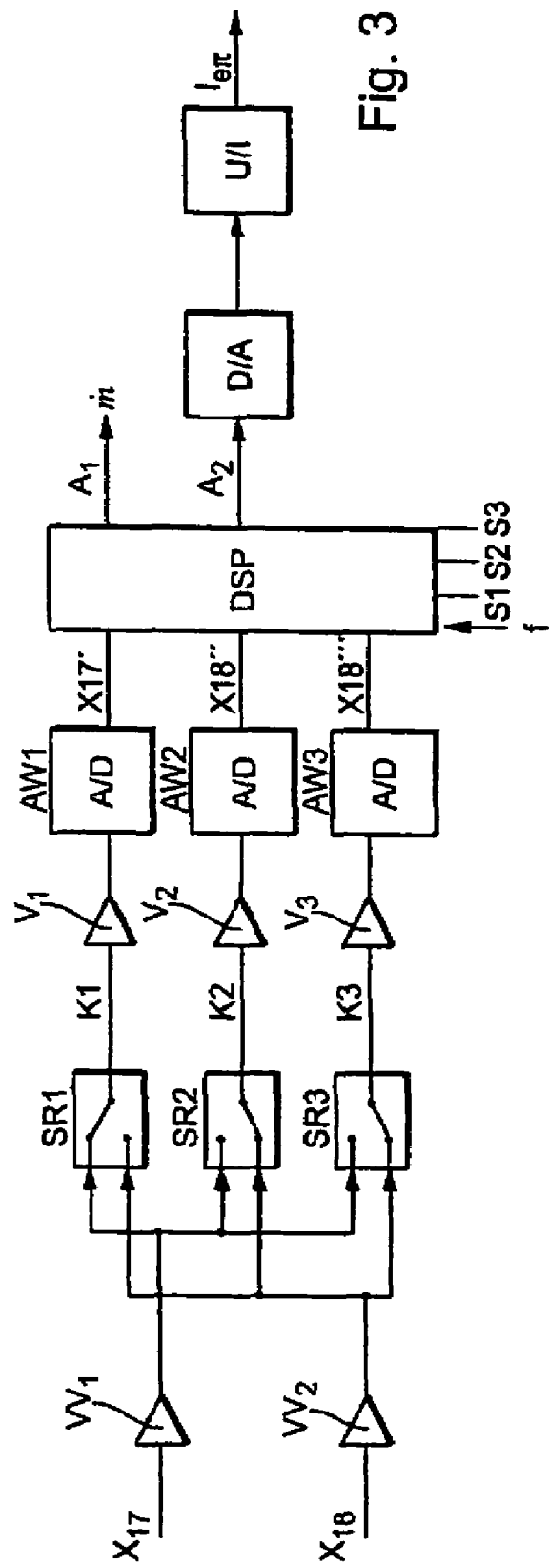
Figure 5:
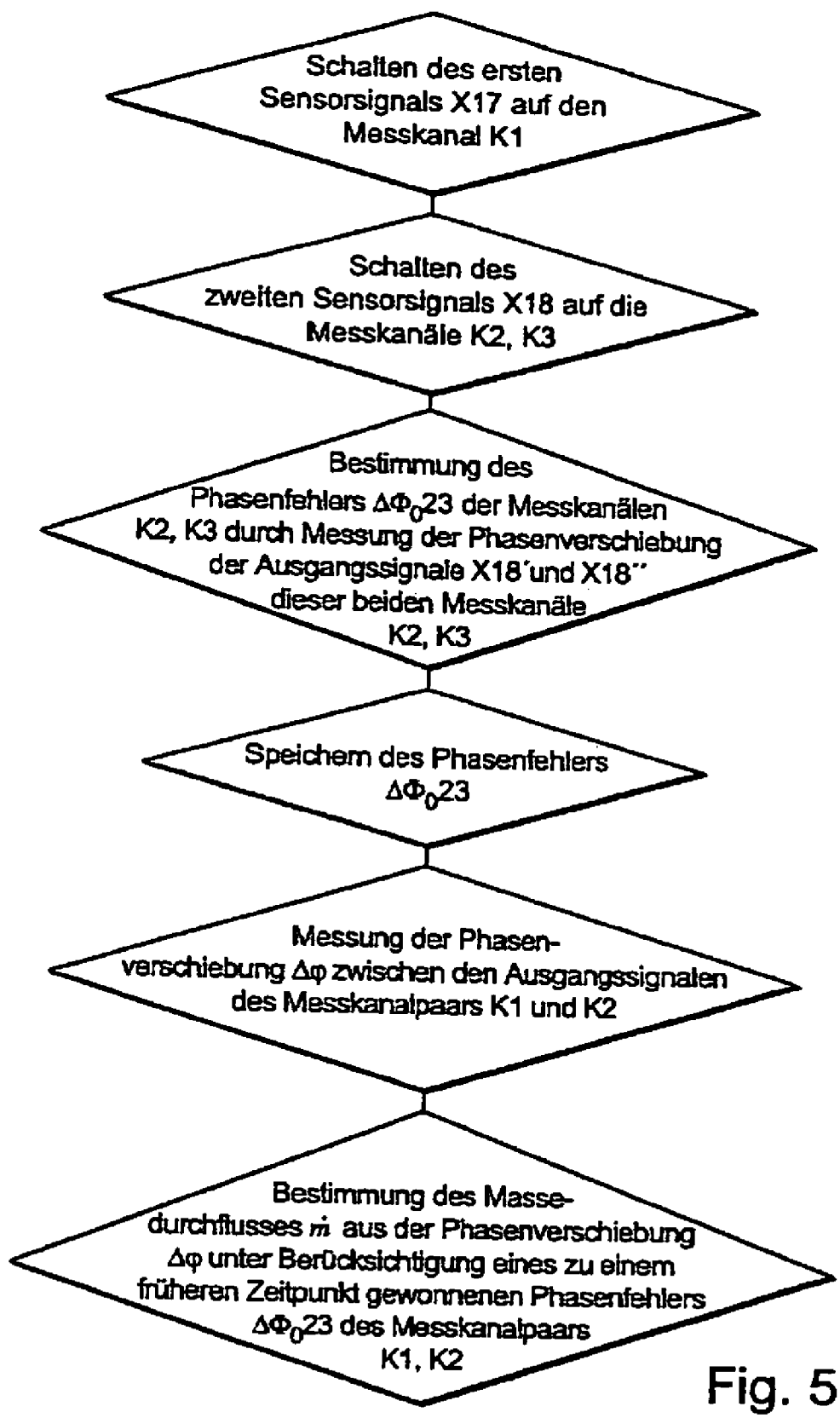

The invention will now be explained on the basis of an embodiment presented in the drawing, the figures of which show as follows:

FIG. 1 measuring transducer for a Coriolis mass-flow meter;

FIG. 2 block diagram of a measuring and operating circuit for the measuring transducer of FIG. 1;

FIG. 3 block diagram of a measuring and operating circuit of the invention;

FIG. 4 tabular association, measuring channel, sensor signal;

FIG. 5 flow diagram showing the individual method steps.

FIG. 1 shows, schematically, a measuring transducer 1 for a Coriolis mass-flow meter. Measuring transducer 1 is arranged in a pipeline (not shown), in which a fluid F is flowing, whose mass-flow is one of the variables of interest. Connection with the pipeline is accomplished via the two flanges 2, 3.

Measuring transducer 1 has a single, straight measuring tube 4, which is affixed to flange 2 on the inlet side via an end plate 13 and to flange 3 on the outlet side via an end plate 14.

The measuring and operating circuit of the invention is not limited to this special measuring transducer 1 having a single, straight measuring tube. Thus, it can be used in connection with any of the various known measuring transducers. To be mentioned are e.g. measuring transducers having a measuring tube equipped with outlier masses, such as described e.g. in EP 97 81 0559, measuring transducers having a curved measuring tube (EP 96 10 9242), as well as measuring transducers having two parallel, straight or curved, measuring tubes (U.S. Pat. No. 4,793,191 or U.S. Pat. No. 4,127,028).

The flanges 2, 3 and the end plates are secured to or in a support tube 15.

For producing the measuring tube oscillation, an oscillation exciter 16 is arranged on the measuring tube 4, in the middle, between the two end plates 13, 14. Oscillation exciter 16 can be e.g. an electromagnetic drive composed of a permanent magnet 161 and a coil 162.

Coil 162 is affixed to the support tube 15 and the permanent magnet 161 is affixed to the measuring tube 4.

Via the current flowing in the coil 162, the amplitude and frequency of the bending oscillation of the measuring tube 4, which occurs in the plane of the drawing, can be controlled.

Also arising in the plane of the drawing are the Coriolis forces, which effect that all points along the measuring tube 4 no longer oscillate in phase.

The oscillatory movement of the measuring tube 4 is registered with the help of two oscillation sensors 17, 18, which are arranged likewise on the support tube 15 essentially symmetrically about the oscillation exciter 16. The oscillation sensors 17, 18 can be e.g. electromagnetic transducers, which are constructed similarly to the mentioned permanent magnet and coil of the oscillation exciter 16.

The two permanent magnets 171, 181 are affixed to the measuring tube 4 and the two coils 172, 182 are affixed to the support tube 15. The movement of the measuring tube 4 induces, via the magnets 171, 181, voltages in the respective coils 172, 182, and these voltages are tapped as the analog sensor signals X17, X18.

A Coriolis mass-flow meter is composed, as a rule, of a measuring transducer and an associated measuring and operating circuit.

FIG. 2 shows a block diagram of such a measuring and operating circuit belonging to the measuring transducer 1. Among other things, this circuit performs the evaluation of the two sensor signals and controls the exciting of the measuring tube 4 to oscillate.

The two sensor signals X17 and X18, which are registered by the oscillation sensors 17, 18, are amplified in the two pre-amplifiers VV1 and VV2 and in each case digitized in an analog/digital converter AW1, AW2 to provide two digital sensor signals X17, X18, which are fed to a digital signal processor DSP. The digital signal processor DSP delivers to a first output A1 the measured value of the mass-flow ṁ. An output A2 delivers a signal, which controls the exciter current $I_{ex}$ for the oscillation excitement of the measuring tubes. The two sensor signals X17 and X18 are, as indicated in the drawing, fed via two measuring channels K1 and K2 to the digital signal processor DSP.

FIG. 3 presents, in greater detail, a block diagram of a measuring and operating circuit of the invention. This measuring and operating circuit has three measuring channels K1, K2, K3, but, otherwise, corresponds essentially to the circuit shown in FIG. 2. The two sensor signals X17 and X18 are delivered, respectively, from the two coils 172 and 182. The two sensor signals are amplified in the pre-amplifiers VV1 and VV2 and each is then fed to the three switches SR1, SR2, SR2. Each of these switches is associated, respectively, with a measuring channel K1, K2, K3. In each of the measuring channels K1, K2, K3, there is, besides the switches SR1, SR2, SR3, in each case, an amplifier V2, V2, V3, with analog/digital converters AW1, AW2, AW3, respectively, following thereon. The outputs of the three analogue/digital converters AW1, AW2, AW3 deliver signals referenced, respectively, by one of the primes, single-prime, double-prime, triple-prime, i.e. ', ", "', to a digital signal processor DSP. The digital signal processor DSP calculates, from the frequency f of the measuring tube oscillation and the particular phase shift between two input signals, e.g. X17' and X18", the mass-flow ṁ, which is output on output A1. The switches SR1, SR2, SR3 are controlled by three control signals S1, S2, S3 delivered from the digital signal processor.

An output A2 delivers a signal which controls the exciter current $I_{ex}$ for the oscillation excitement of the measuring tubes.

The table of FIG. 4 explains how the two sensor signals are switched to the three channels K1, K2, K3. In a first step, the sensor signal X17 is switched to the channel K1 and the sensor signal X18 is switched to the two channels K2 and K3. In the first cycle step, the phase error $\Delta\phi_0 23=\phi 2-\phi 3$ between the channels K2 and K3 can be ascertained. In the cycle step 2, there is no new distribution of the signals. In the cycle step 3, the signal X17 is switched to the channel 1 and to the channel 2. The signal X18 remains on the channel 3. In this cycle step, the phase error $\Delta\phi_0 12=\phi 1-\phi 2$ between the channels K1 and K2 can be determined. In cycle step 4, there is again no change of the channel assignments. In cycle step 5, the sensor signal X18 is switched to the channels K1 and K2. The sensor signal X17 remains on the channel K2. In this cycle step, the phase error $\Delta_0 13=\phi 1-\phi 3$ between the two channels K1 and K3 can be determined. Other channel assignments are thinkable, but are not necessary, since all possible phase errors have already been ascertained.

The flow diagram of FIG. 5 presents the method steps concerning the first row of the table of FIG. 4.

In the digital signal processor DSP, the phase error $\Delta\phi_0$ of the two channels with identical signals is measured and stored. In determining the phase difference $\Delta\phi$ of the two sensor signals X17 and X18, the phase error $\Delta\phi_0$, which is caused by the different measuring channels, is appropriately taken into consideration (see table of FIG. 4). In the calculation of the mass-flow ṁ the phase error is likewise taken into consideration. In this way the measuring accuracy of a Coriolis mass-flow meter can be significantly increased. The method of the invention also inherently catches time-varying influences, e.g. the temperature dependency of the phase error.

It has been found to be very advantageous for the frequency measurement and amplitude determination, when a signal, here the signal X18, is assigned permanently to a particular channel, here the channel K3.

The changing of the channel assignments occurs about every 10 seconds. A typical value for the measuring tube oscillation is 800 Hz. The measuring tube diameter is 12 mm.

The invention is especially also of an advantage when the individual switches SR1, SR2, SR3 cause a phase error.

The invention claimed is:

1. A method for determining mass-flow with a Coriolis mass-flow meter, wherein the mass-flow is won from a phase difference of a first sensor signal, and a second sensor signal, wherein there is provided, for the two sensor signals, three measuring channels, via which the signals are fed to a digital signal processor, and switches are provided, which enable switching of the sensor signals to the individual measuring channels K1, K2, K3, comprising the steps of:

switching the first sensor signal to a measuring channel K1;
switching the second sensor signal to the measuring channels K2, K3; ascertaining phase error of the measuring channels K2, K3 by measuring phase shift of output signals of these two measuring channels;
storing the phase error;
measuring the phase shift between the output signals of the measuring channel pair K1 and K2;
ascertaining the mass-flow from the phase shift taking into consideration a phase error of the measuring channel pair K1, K2 won at an earlier point in time.

2. The method as claimed in claim 1, wherein:
the sensor signals are switched cyclically to the measuring channels K1, K2, K3.

3. The method as claimed in claim 2, wherein:
the measuring channel K3 is provided permanently for the second sensor measurement signal.

4. The method as claimed in claim 3, wherein:
a measuring of the phase error of two measuring channels occurs only at every second cycle step.

5. An apparatus for performing a method for determining mass-flow with a Coriolis mass-flow meter, comprising:
a first sensor producing a first sensor signal;
a second sensor producing a second sensor signal;
three measuring channels, K1, K2 and K3;
a digital signal processor for receiving the first sensor signal and the second sensor signal via said measuring channels; and
three switches which enable switching of the sensor signals to said measuring channels, wherein:
the first sensor signal is switched to said measuring channel K1 and the second sensor signal is switched to said measuring channels K2 and K3;
a phase error of said measuring channels K2 and K3 is ascertained from measured phase shift of output signals from said measuring channels K2 and K3;
a phase shift of the output signals of said measuring channels K1 and K2; and
ascertaining mass-flow from said phase shift taking into consideration a phase error of said measuring channel pair K1 and K2.

* * * * *